(12) United States Patent
Guckert et al.

(10) Patent No.: US 6,641,693 B2
(45) Date of Patent: Nov. 4, 2003

(54) PROCESS FOR PRODUCING STRUCTURAL PARTS, STRUCTURAL PART PRODUCED BY THE PROCESS, THERMAL INSULATION CYLINDER, PROTECTIVE TUBE, HEATING ELEMENT, STAY PIPE, HOT-PRESS DIE AND THERMAL INSULATION ELEMENT

(75) Inventors: Werner Guckert, Baar (DE); Siegfried Rauch, Valencia (DE)

(73) Assignee: SGL Carbon AG, Wiesbaden (DE)

(*) Notice: Subject to any disclaimer, the term of this patent is extended or adjusted under 35 U.S.C. 154(b) by 59 days.

(21) Appl. No.: 09/865,007

(22) Filed: May 24, 2001

(65) Prior Publication Data

US 2002/0003004 A1 Jan. 10, 2002

(30) Foreign Application Priority Data

May 24, 2000 (DE) ......................... 100 25 628

(51) Int. Cl.⁷ .............................. B65H 81/00
(52) U.S. Cl. ................ 156/171; 156/169; 156/191; 156/194
(58) Field of Search ................ 156/171, 173, 156/175, 184, 189, 190, 194, 195, 169

(56) References Cited

U.S. PATENT DOCUMENTS

| | | | | |
|---|---|---|---|---|
| 2,742,931 A | * | 4/1956 | De Ganahl | 156/195 |
| 3,616,000 A | * | 10/1971 | Butzow et al. | 156/173 |
| 3,700,527 A | * | 10/1972 | Grosh | 156/426 |
| 3,917,884 A | * | 11/1975 | Jahn | 427/228 |
| 4,187,738 A | * | 2/1980 | Knight et al. | 74/572 |
| 4,273,601 A | * | 6/1981 | Weingart | 156/189 |
| 4,495,231 A | * | 1/1985 | Laskaris et al. | 428/36.1 |
| 4,555,113 A | | 11/1985 | Shimazaki et al. | |
| 4,581,263 A | * | 4/1986 | Lukas | 428/36.3 |
| 5,047,104 A | | 9/1991 | Preis et al. | |
| 5,135,596 A | | 8/1992 | Pabsch et al. | |
| 5,638,870 A | | 6/1997 | Takada et al. | |
| H1872 H | * | 10/2000 | Bowman | 156/172 |

FOREIGN PATENT DOCUMENTS

| | | |
|---|---|---|
| DE | 1949115 | 10/1970 |
| DE | 2142015 | 4/1972 |
| DE | 4021547 A1 | 1/1992 |
| EP | 0443470 A2 | 8/1991 |
| GB | 1327246 | 8/1973 |
| GB | 2127771 A | 4/1984 |

* cited by examiner

*Primary Examiner*—Jeff H. Aftergut
(74) *Attorney, Agent, or Firm*—Laurence A. Greenberg; Werner H. Stemer; Gregory L. Mayback (57) ABSTRACT

A developable structural part, such as a component, includes at least one layer made from a resin-impregnated fabric (prepreg) and at least one layer made from wound threads, yarns, rovings or ribbons. At least one constant thread tension, but preferably a thread tension increasing from layer to layer, is applied during winding of the threads, yarns, rovings or ribbons. An outer ply is always formed of wound threads, yarns, rovings or ribbons. A process for producing the structural parts, a thermal insulation cylinder, a protective tube, a heating element, a stay pipe, a hot-press die and a thermal insulation element are also provided. The developable component or structural part can be obtained due to a combination of the application of fabric prepreg layers and windings made from threads, yarns, rovings or ribbons. The component or structural part has particularly high strength, outstanding mechanical properties and chemical resistance after curing of the resin matrix, or after curing and carbonizing, or after curing, carbonizing and graphitizing.

19 Claims, 4 Drawing Sheets

PROCESS FOR PRODUCING STRUCTURAL PARTS, STRUCTURAL PART PRODUCED BY THE PROCESS, THERMAL INSULATION CYLINDER, PROTECTIVE TUBE, HEATING ELEMENT, STAY PIPE, HOT-PRESS DIE AND THERMAL INSULATION ELEMENT

BACKGROUND OF THE INVENTION

Field of the Invention

The invention relates to a process for producing components or structural parts, a structural part produced by the process, a thermal insulation cylinder, a protective tube, a heating element, a stay pipe, a hot-press die and a thermal insulation element.

In the context of this invention the term "developable structural parts" is understood to mean a three-dimensional structural part, the body of which can be developed by geometric transformation into one plane and in that way can be illustrated in a drawing. Such structural parts include, for example, tubes or cylinders which have a circular, oval or even angular, for example, rectangular or square, cross-section and are hollow.

The production of tubular structural parts from fibrous composites is known in principle. Such structural parts are produced, for example, by laminating a plurality of fabric layers impregnated with a resin, preferably a synthetic resin, which are so-called prepregs, on top of one another. The production of developable fibrous composites which are free of structural defects is difficult and is carried out in accordance with a complex multi-stage process. In order to obtain a product which is free of gaps and wrinkles, approximately two to four layers of fabric are generally laid or wound on top of one another. Subsequently, the body obtained in that way must be subjected to a treatment during which the resin contained therein cures. Before continuing the production process the surface of the cured body must generally be smoothed in order to eliminate irregularities thereon and to prepare it for the accommodation of further prepreg layers. Such intermediate curing is very often carried out in conjunction with shaping and compaction by the vacuum bag process which is known among experts, for which a specific device is necessary. In that case, an autoclave used for the vacuum bag process is additionally adjusted to the desired curing conditions. After such intermediate curing, which is also time-consuming, further fabric layers are then applied to the surface. That process sequence is maintained until achieving the desired wall thickness of the element, which is to be produced. When producing high quality fibrous composite elements, up to three or even more such winding processes have to be carried out with intermediate curing. That process is therefore very time-consuming and cost-intensive. Consequently, for cost reasons, structural parts produced in that way are only used where structural parts made from other materials behave very unfavorably or fail.

A tubular structural part that is known from U.S. Pat. No. 5,638,8705 is produced from a fabric composed of reinforcing fibers which extend in warp direction of the fabric, corresponding to axial direction of the tubular element, and of thermoplastic resin fibers which extend in weft direction of the fabric and interweave with the reinforcing fibers. An example of the structure of the structural part known from that patent includes a first and a second fabric layer between which an intermediate layer of uniformly oriented fibers is disposed. That layer of uniformly oriented fibers is produced from fiber bundles which have reinforcing fibers and thermoplastic resin fibers. The composite produced in that way is applied to a core (mandrel), is subsequently shaped with the application of pressure and heat, and a mould for the external shaping is applied around the composite from the outside.

The disadvantages of that process are, on one hand, the complex process and, on the other hand, the necessity of having to use an external shaping tool.

Winding techniques for producing tubular structural parts are also known. U.S. Pat. No. 5,047,104 describes solid or hollow profiles made from fibrous materials which are impregnated with liquid resin and then covered with non-impregnated fibers or monofilaments made from organic materials. Those organic materials are selected in such a way that shrinkage forces are still active before the reactive resin being used reaches a gel phase. A covering of the first-mentioned fiber materials by the winding fibers of only approximately 12% is sufficient. The organic fibers being applied shrink during a subsequent curing step and penetrate into the resin. Due to that procedure it is possible to produce cross-sections in the structural parts which are exactly circular, wherein no external shaping units have to be used. Such structural parts are suitable in particular as cables or wires for reinforcing concrete. They also exhibit a high degree of weather resistance.

European Patent Application 0 443 470 A2, corresponding to U.S. Pat. No. 5,135,596, describes a structural part made from fibrous composites with a tubular region and at least one plane flange. A winding with fiber strands crossing at an angle to the axis of the core is applied to a mandrel. Subsequently, the ends of the tubular region are widened conically through the use of an expanding element. The winding is wound on both sides of the tubular region in each case through the use of such an expanding element and a shaping tool is applied to the tubular region of the winding from the outside.

German Published, Non-Prosecuted Patent Application DE 40 21 547 A1 describes a process for producing fibrous composite elements, wherein fibers are wound around a support element so as to be practically free of pores. To that end fiber ribbons are used in which individual fibers are surrounded without the formation of a hollow space by matrix material. Covered individual fibers which are gap-free can also be wound with matrix material. During subsequent hot isostatic pressing, matrix material, fibers and support elements are connected by fluid formation. Due to the use of fiber ribbons which have a substantially rectangular cross-section, embedding of the fiber ribbon layer into the matrix material is achieved, with the displacement of the fibers when using the structural part being avoided. In addition, due to the rectangular cross-section of the fiber ribbon, covering which is free of intermediate spaces is possible.

UK Patent Application GB 2 127 771 A describes the production of irregularly shaped winding elements which are formed of a first layer that is made, for example, from longitudinally oriented fabric segments being formed of carbon fibers which are wound on a mandrel and are formed of a second layer of transversely wound continuous fibers. The winding elements are then impregnated with thermoplastic or thermoset materials and the resin is cured. A carbonization treatment can then optionally follow. According to a second variation, fabric layers are wound onto the core specifically so as to conform to the later shape of the winding element or the core, until the desired strength of the winding is achieved. The core is therefore substantially covered by the fabric which contains a large number of warp threads that are wound peripherally around the core and a large number of weft threads crossing the former, which are disposed orthogonally to the weft threads. Subsequently, as in the first variation, impregnation with resin takes place. Curing of the resin and optionally further processing steps then follow.

The essential feature in both variations is that the wound layers are applied in the dry state and are impregnated in a later processing step. A dry structure is therefore described in that publication in which the fabric or the fabric segments have to be fixed in order to prevent slipping.

U.S. Pat. No. 4,555,113 describes the production of a shaft, for example for golf clubs, in which a resin layer is applied to a mandrel and a fabric is applied on top. Two different types of carbon fiber ribbons are wound spirally over that formed body in winding directions which are opposed to one another, so that many points of intersection are obtained as a result of that winding technique. Subsequently, the surface of the winding element is covered by a ribbon of CELLOPHANE and the resin is cured. The ribbon of CELLOPHANE and the inner shaping mandrel are then removed, whereby the desired shaft is obtained.

The above-mentioned processes have the disadvantage of using a processing sequence which includes many steps that are not only time-consuming but also cost-intensive. In many of the conventional production processes, in particular, structuring of a wall of the winding element has to be carried out in a plurality of steps in order to avoid faults and flaws therein. In other words, after applying a certain relatively low number of winding layers the winding element must be removed from the winding machine and impregnated with resin and the resin must be cured or, if the winding element already contains resin, only the resin has to be cured. The surface of the winding element then only needs to be smoothed in order to eliminate irregularities on the surface of the winding element and to ensure good bonding of the subsequent winding layers. Then the winding element treated in that way must be clamped in the winding machine again and winding continues. In many cases that process must be repeated several times in order to obtain a finished winding element. A further problem is post-compacting of the winding element. That is understood to mean the further compacting and solidifying of a winding element containing resin. In that case, use is made of the known vacuum bag technique in which according to a variation, an external atmospheric pressure of approximately 1 bar acts in a compacting manner after evacuation of the structural part located in the vacuum bag.

According to a second preferred variation in which the vacuum bag is located in an autoclave, a pressure medium is additionally applied after evacuation, so that the compacting pressure can be arbitrarily increased within certain limits. However, as a consequence of that compacting, wrinkles and delaminations often occur in the layers of the composite element. As a result, defects are inevitably produced which in particular impair the mechanical and electrical properties of the composite element. The production of high quality composite elements with reproducible properties is only possible in that way with a disproportionate level of expenditure. Electrical heating elements produced in the conventional manner, for example, often have unequal electrical resistances between the elements and within the elements, so that their useful value is reduced. Load-bearing structural parts produced in the conventional manner must therefore be constructed with a greater safety correction value which also leads to an increase in costs.

SUMMARY OF THE INVENTION

It is accordingly an object of the invention to provide a process for producing structural parts, a structural part produced by the process, a thermal insulation cylinder, a protective tube, a heating element, a stay pipe, a hot-press die and a thermal insulation element, which overcome the hereinafore-mentioned disadvantages of the heretofore-known processes and devices of this general type. The process is to provide a technically simple and inexpensive way of producing structural parts made from fibrous composites. The structural parts are to additionally be free of defects as a result of wrinkles or displacement of parts of wound material, to exhibit more uniform and improved mechanical and electrical properties and to demonstrate improved behavior during mechanical processing. The stable structural part is to have outstanding mechanical, chemical and electrical properties and the thermal insulation cylinder and the developable structural part are to be particularly favorable.

With the foregoing and other objects in view there is provided, in accordance with the invention, a process for producing developable structural parts made from fibrous composites. The process comprises applying at least one layer of a resin-impregnated fabric or prepreg and at least one layer made from resin-saturated or resin-free wound threads, yarns, rovings or ribbons onto a shaping temporary mandrel using an at least constant thread tension during winding of each layer made from threads, yarns, rovings or ribbons, to form a structural part having an outer ply formed of the wound threads, yarns, rovings or ribbons. The structural part is treated by curing, or curing and carbonizing, or curing, carbonizing and graphitizing, after the winding step.

The terms used below are to have the following meaning in the context of the invention:

Yarns are produced by twisting or spinning continuous or staple fibers. They must have a tensile strength which permits winding with a thread tension of at least 10 N for use in the process according to the invention.

Rovings are textile strands formed by continuous filaments or individual fibers which are not twisted with one another and are disposed in parallel.

Ribbons are formed of rovings, yarns or threads disposed adjacent and parallel to one another. The rovings, yarns or threads are either not connected to one another or are fixed in their position through the use of auxiliary threads extending transversely to the longitudinal direction of the ribbons.

According to the invention, a combination of laminating and winding processes which is known per se and which uses at least two specific materials while observing certain conditions, is described. It is essential to the invention in this case that the winding of all layers of threads, yarns, rovings or ribbons takes place by using an at least uniform thread tension which is selected so as to be sufficiently large that the layers located therebelow or the layers located thereabove made from the resin-saturated fabric or prepreg are pressed against and compacted and fixed in their positions. The layers made from threads, yarns, rovings or ribbons are preferably wound in such a way that each layer is wound with a thread tension that is greater than the thread tension with which the previously wound layer of threads, yarns, rovings or ribbons was wound. A further feature of the invention is that the last, outermost winding ply always is formed of a layer of threads or yarns or rovings or ribbons. As a result of this procedure, it is possible to achieve an optimal compacting of the structural part which is uniform over its length and cross-section. Accordingly, structural parts which are produced by the process have a uniform, flaw-free structure, and a uniform distribution of the mechanical and electric ratings therein can be achieved at a higher level both in the axial and in the radial direction. Separate post-compacting and curing between application of the winding layers with consequent time-consuming interruptions to the winding process are no longer necessary. Processing after the comparatively time-consuming and expensive vacuum bag process is also no longer necessary when using the process according to the invention. The process according to the invention is therefore considerably more cost-efficient and economical and structural parts of considerably improved quality are obtainable thereby. In particular, the disadvantages of the known processes (tubes being formed only of fabric prepreg or tube being formed only of roving windings) can be avoided but their advantages can be exploited.

The developable structural parts according to the invention can be used in many areas. They are preferably used in a carbonized or graphitized state as protective tubes, heating tubes, hot gas tubes, thermal insulations, for example when producing semiconductor materials, as nozzles, but also as stay tubes, support profiles or hot-press dies. They can be outstandingly and accurately processed mechanically, for example by sawing, turning, milling or drilling, so that they can be provided with ducts, inspection holes, flange connection points or other devices, or serpentine heating elements, for example, can be produced therefrom. It is even possible to drive nails through such structural parts without destroying them. Their suitability as structural parts, in particular tubes for any use in the chemical industry, should also be emphasized since the structural parts according to the invention exhibit a high level of chemical resistance. The structural parts furthermore possess high impact strength and high pressure resistance. In the case of graphitized tubular structural parts, the pressure resistance is in a range from approximately 400 $N/mm^2$ and is therefore higher by a factor of 3 to 4 than in the tubes produced by the known winding processes. This higher resistance and higher density is possible in particular due to the post-compacting with the threads, yarns, rovings or ribbons. It is only cured, non-carbonized, non-graphitized structural parts which can be used, when they have a cylindrical shape, as transport, support, guiding, contact pressure or application rollers for the production or processing of material webs such as paper, films, textiles or printed matter.

It appears therefore that a very large number of possibilities exist for the process according to the invention of producing developable structural parts and that such structural parts can be specifically created as required. Fundamental influential factors in this case are, firstly the sequence of layers in the winding process and their structure and quality, secondly the choice of fabric, prepregs and fiber and filament materials used, thirdly the choice of resins or carbon substrates used, fourthly the choice of thread tension during winding of the layers of threads, yarns, rovings or ribbons, fifthly the post-treatment after obtaining the wound and cured structural part, i.e. whether the structural part is still to be carbonized or carbonized and graphitized and finally, sixthly whether the structural part is still post-compacted after carbonizing or graphitizing, i.e. whether the open pore system of the structural part is filled with an impregnating agent by one or more impregnating steps and whether the structural part is then carbonized or graphitized again. A large number of production variations can be achieved which all lie within the scope of the invention, by varying the above-mentioned influential factors.

With regard to the winding layers, a layer of thread, yarn, roving or ribbon can follow a layer of fabric or prepreg. However, further layers of fabric or prepreg and of threads, yarns, rovings or ribbons can also alternately follow these two layers, and this method is preferred. According to a further variation, more than one layer of a fabric or prepreg are initially wound, for example, onto the temporary mandrel or core and then a layer of thread, yarn, roving or ribbon is wound onto these at least two layers made from fabric or prepreg. It is also possible in this case for this structure of more than one layer of fabric or prepreg and one layer of threads, yarn, roving or ribbon to be repeated once or several times in radial direction. According to another variation, the sequence of layers is not constant as in the previous examples but is selected freely. Accordingly, it is possible, for example, to initially apply two layers of a prepreg, then a layer of threads, yarn, roving or ribbon, then three layers of a fabric or prepreg, then another layer of a thread, yarn, roving or ribbon and finally a layer of fabric or prepreg, followed by a last outer layer of thread, yarn, roving or ribbon. As will be described further below, layers of suitable non-woven material or foil or both can be inserted between the winding layers described herein by winding. The fabric used for winding can be free of resin. However, it is preferably impregnated with an uncured resin and therefore has prepreg characteristics. When a winding layer of thread, yarn, roving or ribbon is mentioned in the context of this invention, preferably two winding layers of thread, yarn, roving or ribbon which are applied so as to cross one another at a specific angle are meant. However, it is also possible for such a winding layer to be formed of only one layer of thread, yarn, roving or ribbon. The threads, yarns, rovings or ribbons being used can be impregnated or covered with a resin which is not cured, or they can be used without a resin coating. According to a preferred variation, the developable structural part is produced from alternate layers of fabric prepreg and rovings or ribbons, with the individual roving or ribbon layers being wound from the inside to the outside layer with increasing tensile stress or thread tension. As a result the compacting effect in the layers located therebelow is reinforced, in a manner similar to a cable winch.

Fabrics of various weaves, such as plain, twill or satin, for example, can be used. Twill and plain are preferred. The fabrics can be formed of any conventional type of fiber as long as the structural parts are only used in the cured state. However, they can also be formed of metal fibers or filaments, for example of molybdenum. If the structural parts are to be carbonized or carbonized and graphitized, the fabrics are formed of cellulose, polyacrylonitrile, molybdenum or preferably of carbon or graphite fibers. According to a particularly preferred variation which leads to structural parts which are capable of bearing heavy loads, the fabrics are formed of rovings made from graphitized carbon fibers, in particular of high modulus graphite fibers.

In the context of the invention, carbon fibers are fibers formed of carbon which have been heated to temperatures of less than 1,800° C., preferably to 1,000 to 1,400° C. Graphite fibers are fibers formed of carbon which have been heated to temperatures of at least 1,800° C., preferably to temperatures of 2,200 to 2,700° C. The structural parts are heated in a non-oxidizing atmosphere to temperatures in a range from 800 to 1,600° C., preferably from 900 to 1,400° C., for carbonization. They are heated under non-oxidizing conditions to temperatures in a range from 1,800 to 3,000° C., preferably from 2,000 to 2,700° C., for graphitization.

The yarns being used for the process according to the invention are formed of staple fibers made from wool, cellulose, polyacrylonitrile or carbon which have been spun with one another. Graphitized carbon yarns are used for the production of very high quality structural parts.

The yarns being used for the process can be produced by twisting yarns or rovings. The rovings being used according to the invention are formed of mutually parallel monofilaments made from cellulose, polyacrylonitrile or carbon or graphite fibers. In special cases, metal fibers, for example molybdenum-containing metal filaments, can be used. Rovings made from a large number of carbon or graphite filaments, namely from a number of carbon or graphite filaments in a range of from 3,000 to 60,000 are preferably used. Rovings with a monofilament index of 6,000 to 24,000 made from a graphite fiber which has been produced on the basis of polyacrylonitrile, are preferably used. The roving made from carbon or graphite filaments preferably has a tensile strength in a range from 2,000 to 3,600 MPa and a density preferably in a range from 1.75 to 1.90 g/cm$^3$.

Ribbons formed of a plurality of threads, yarns or rovings which are disposed adjacent one another, can be fixed in their position by transverse textile connecting elements.

As a result of winding the thread, yarn, roving or ribbon layers, the layers of the structural part located therebelow are compacted and the fiber and resin distribution in the fabric or prepreg layers is standardized.

If structural parts are to be produced for applications at temperatures above 1,800° C., it is advantageous to use all of the textile structural parts which are necessary therefor in graphitized quality. As a result, distortion of the structural parts during the production process is avoided.

Any natural and synthetic resins known from the state of the art as resins for impregnating the fabric and optionally the threads, yarns, rovings and ribbons and for producing the prepreg, but also pitch or pitch-resin mixtures, can be used for this purpose. However, epoxy, furan and phenolic resins are preferably used. Phenolic resins are particularly preferred if the structural parts are also to be carbonized or carbonized and graphitized after curing. Once a wound and cured structural part has been freed from the winding core and has been carbonized, in many cases it is then post-compacted in order to improve its physical properties, specifically its resistance. This is understood to mean filling of the pore system which is accessible to liquid with a resin, in particular a synthetic resin, or with a pitch and a subsequent carbonization or carbonization and graphitization of the resin or pitch which is thus introduced. Phenolic resins or pitches with a large carbon residue during carbonization or else mixtures of synthetic resins and pitches are preferably used for this processing step, which can also be carried out several times and can also be carried out with graphitized structural parts as well.

The tensile stresses applied during winding of the threads, yarns, rovings or ribbons, which will subsequently be referred to as thread tensions, can be varied within a large range. The thread tension that is actually used depends on the desired degree of compacting of the layers which are to be covered by the winding, which has a fundamental influence on the resistance and stability of the structural part to be produced. The thread tensions being applied vary in a range from 10 to 300 N. Therefore, it is possible, for example, to apply a thread, yarn, roving or ribbon tension, depending on the strength of the thread, yarn, roving or ribbon or the pressure sensitivity of the material located under this winding layer, of only approximately 10 to 20 N. However, higher thread tensions are also possible. Comparatively low thread tensions in a range from 10 to 200 N, preferably 10 to 100 N, are preferably used when the developable structural parts contain layers of non-woven material or graphite foil which can be constricted in the event of radial pressure that is too high with the consequent formation of non-homogeneities within the structural part. An example of this would be cylinders or jackets for the purpose of thermal insulation. It is expedient for the production of tubes or structural parts which are highly loaded to apply thread tensions in a range from approximately 100 to 250 N.

The developable structural parts can, for example, be produced for use as transport, support, guiding, contact pressure or application rollers for the production or processing of material webs such as paper, foils, textiles or printed matter in the form of plastics materials reinforced with fiber materials which are not carbonized or graphitized. To this end, they are removed from the winding machine after winding of the layers and, in accordance with one of the known processes, subjected to a process for curing the resin. A solid resin matrix is produced in the process, through the use of which the textile intermediate parts are incorporated into the structural part and connected to one another through bridges of cured resin in such a way that a high quality structural part made from composite material is produced. The processing steps that are known per se and are removal of the winding core or mandrel and processing and optionally post-treatment of the end faces and surfaces, then follow.

The developable structural parts are formed of carbon or graphite, preferably of carbon reinforced with carbon or graphite fibers or of graphite reinforced with graphite fibers for certain larger loads or for applications at high temperatures. In order to produce such structural parts, the structural parts produced by using suitable textile reinforcing materials and suitable resins are carbonized in the cured, non-carbonized state in the absence of oxidizing substances. In certain cases they can already be used in this state after processing has finished. If their data level in the simply carbonized state does not satisfy requirements, these elements can be post-compacted once or several times by impregnation and subsequent carbonization. In this case, a considerable improvement in the data level, specifically with respect to strength and stiffness, is produced. If the requirement profile for the developable structural parts demands it, graphite elements reinforced with graphite fibers are produced. To this end, structural parts in the carbonized state are subjected to a further graphitization treatment. Of course, the starting point in this case can also be a merely cured structural part and the steps of carbonization and graphitization can be run through in succession in a single operating step. The graphitized elements can then still be post-compacted as described above as required, with it being possible for the graphitized element impregnated with the carbon substrate to be carbonized only or carbonized and graphitized. When producing reinforced carbon and graphite structural parts, graphitized fabrics and rovings are preferably already used during winding of the winding element in order to exploit the large modulus of elasticity and the outstanding resistance properties of the graphite fibers, in particular of the so-called high modulus graphite fibers in and for the structural part and to prevent distortion of the structural parts during the production process.

From the above-mentioned explanation it follows that the process according to the invention can be embodied in a large number of variations and that as a result, a large number of different types of developable structural parts can be produced with properties which are sometimes very different. The person skilled in the art must decide on the basis of his or her knowledge and the technical demands on the structural part, which of the various process variations is used. In doing so, he or she will optionally make use of simpler tests, which he or she carries out by using the teaching given herein.

The wall thickness of the developable structural parts can be in a range from a few millimeters up to 120 mm. In structural parts which have been constructed solely from fabrics, prepregs, threads, yarns, rovings, ribbons and resin, the wall thickness is preferably in a range from 3 to 30 mm. In structural parts which additionally contain layers of non-woven material or foils, such as in the case of elements for use in high temperature devices, wall thicknesses in a range from 30 to 80 mm are preferably used.

Depending on the intended application of the structural parts being produced, one or more layers of a non-woven material can be inserted into the structural part in addition to the wound layer or layers of fabric or fabric prepreg and the layer or layers of threads, yarns, rovings or ribbons. Carbon fiber non-woven materials or graphite fiber non-woven materials which have been produced from cellulose fiber non-woven materials or from polyacrylonitrile fiber non-woven materials by carbonization or by carbonization and graphitization are suitable, on one hand, as materials for these non-woven materials. Another type of carbon or graphite fiber non-woven materials which can be used in this case has been produced from carbonized or graphitized pitch fibers by needling to form non-woven materials or by graphitizing a non-woven material produced from carbonized pitch fibers. However, ceramic non-woven materials such as non-woven materials made from aluminum oxide fibers, basalt fibers or rockwool or non-woven materials based on cellulose or polyacrylonitrile fibers can also be used. If a good thermal insulating property is desired, in particular in a developable structural part containing non-woven material layers, graphite non-woven materials are preferably used which have been produced from cellulose non-woven materials. It should be acknowledged that a large number of different non-woven materials with various properties can be used. The use of a specific non-woven material depends on the application purpose of the structural part, preferably on the temperature requirements placed thereon. The choice of thickness of a non-woven material layer or a plurality of non-woven material layers is also dependent, in addition to the technical requirements which result from the intended application purpose, on the final measurements of the structural parts to be produced. Generally, the thickness of a non-woven material layer after winding is in a range from 2 to 20 mm, preferably in a range from 5 to 10 mm. Thicknesses of up to 20 mm are preferably used when structural parts with larger wall thicknesses are to be produced.

The developable structural part according to the invention can also contain one or more layers of foil instead of non-woven material or in addition to the layer or layers of non-woven material. The layer or layers of foil are also wound. A graphite foil which is particularly suitable in this case is resistant to high temperatures, resistant to chemicals and gas and fluid tight and withstands graphitization treatment or changes to its properties. However, metal foils, based on molybdenum or copper for example, can also be used if the application purpose demands it. It is important that the foil material used in each case be adapted to the thermal and chemical conditions to which the structural part is to be exposed during the production process and the intended application. When using foils, developable structural parts such as tubes or cylinders can be produced, for example, which are gas and fluid tight, exhibit pronounced chemical resistance with respect to non-oxidizing to slightly oxidizing media and have a good thermal insulation property even in a temperature range above 2,000° C. Such structural parts are used in aerospace engineering, high temperature engineering and semiconductor engineering. The thickness of the foil is also selected in accordance with the production and application requirements of the developable structural part. Conventionally, a foil with a thickness of 0.2 to 1 mm is used, with a foil thickness of approximately 0.5 mm being preferred. In special cases or with large diameters of the structural parts it is, of course, also possible to use foils with a thickness of more than 1 mm.

The thickness of a fabric prepreg layer can be in a range of from 0.20 to 2.00 mm. A thickness of approximately 0.5 to 1.0 mm is preferably chosen. If a very fine fabric is used it can be favorable to laminate a plurality of fabric prepreg layers over one another, with three or four layers preferably being laid over one another. Such a multitude of fabric layers can, for example, be approximately 2 mm thick in total.

If a plurality of fabric prepreg layers are disposed above one another these layers do not need to have the same thickness. The same applies to winding layers of threads, yarns, rovings, ribbons and of non-woven materials or foils.

The ratio of fabric or fabric prepreg layers to the layers of threads, yarns, rovings or ribbons is preferably in a range of from 1:1 to 4:1. A larger number of layers can also be provided, depending on the diameter or wall thickness of the developable structural part to be produced.

The angle of the threads, yarns, rovings or ribbons during winding is preferably in a range of from ±20 to ±90° in relation to the winding axis, i.e. the longitudinal axis of the developable structural part. A different winding angle can be set for each layer of threads, yarns, rovings or ribbons. The mechanical and certain electrical properties of the developable structural part can, in particular, be influenced by appropriate selection of the winding angle. Accordingly, the choice of winding angle depends on the properties of the structural part which is to be produced. Winding angles in a range from ±20° are set, in particular, if the structural part must withstand flexural stresses. Winding angles in a range from ±80° to ±90° have the effect of permitting the structural part being produced to absorb high pressures from within. This is particularly important when the structural parts are used as hot pressing dies.

Winding at angles of 70 to 90° can take place without a pin collar. However, with winding angles of less than 70° pin collars must be used, which prevent the threads, yarns, rovings or ribbons from sliding or moving.

The speed of the layers during winding is preferably in a range from approximately 20 to 200 m/min. The choice of speed being used depends in a first instance on the diameter of the structural part to be produced. In principle, the speed is preferably adjusted in such a way that the larger the diameter of the structural part, the slower the speed.

With the objects of the invention in view, there is also provided a developable structural part made from a fibrous composite. The structural part comprises at least one layer of a resin-impregnated fabric or prepreg and at least one layer made from resin-saturated or resin-free wound threads, yarns, rovings or ribbons wound onto a shaping temporary mandrel with an at least constant thread tension of each of the layers made from threads, yarns, rovings or ribbons. The layers have an outer ply formed of the wound threads, yarns, rovings or ribbons and the layers are treated by at least one of curing; curing and carbonizing; and curing, carbonizing and graphitizing, after winding.

With the objects of the invention in view, there is additionally provided a thermal insulation cylinder, a protective tube, a heating element, a stay pipe, a hot-press die or a thermal insulation element, comprising a developable structural part made from a fibrous composite. The structural part has at least one layer of a resin-impregnated fabric or prepreg and at least one layer made from resin-saturated or resin-free wound threads, yarns, rovings or ribbons wound onto a shaping temporary mandrel with an at least constant thread tension of each of the layers made from threads, yarns, rovings or ribbons. The layers have an outer ply formed of the wound threads, yarns, rovings or ribbons and the layers are treated by at least one of curing; curing and carbonizing; and curing, carbonizing and graphitizing, after winding.

Other features which are considered as characteristic for the invention are set forth in the appended claims.

Although the invention is illustrated and described herein as embodied in a process for producing structural parts, a structural part produced by the process, a thermal insulation cylinder, a protective tube, a heating element, a stay pipe, a hot-press die, and a thermal insulation element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the following examples and the accompanying drawings.

EXAMPLE 1

A phenolic resin-containing fabric prepreg was used for the construction of the developable structural part. The fabric of the prepreg had been produced in twill weave from a graphite fiber roving that was formed of 6,000 monofilaments. The weight per unit area of the fabric was 420 g/m$^2$. A roving was used to cover the fabric prepreg layers. The roving was formed of 24,000 high modulus graphite monofilaments. The monofilaments had a density of 1.8 g/cm$^3$ (measured in accordance with DIN 65569) and a tensile strength of approximately 2,400 MPa (measured by using DIN ENV 1007-4). The elongation at break of these fibers is in a range of from 0.6 to 1.0% (measured by using DIN ENV 1007-4). These fabric prepregs and rovings were wound on a winding machine on a 200 mm diameter mandrel, the surface of which had been previously provided with a separating agent, with the following sequence of layers and with the following thread tensions of the roving:

| | |
|---|---|
| 1st layer: prepreg | ply thickness 0.6 mm |
| 2nd layer: roving (tensile stress 70 N) | ply thickness 1.2 mm |
| 3rd layer: prepreg | ply thickness 0.6 mm |
| 4th layer: roving (tensile stress 80 N) | ply thickness 1.3 mm |
| 5th layer: prepreg | ply thickness 0.6 mm |
| 5th layer: roving (tensile stress 90 N) | ply thickness 1.2 mm |

The winding angle of the roving was ±80° to the longitudinal axis of the structural part in each layer, i.e. a layer of roving was wound at an angle of +80° and a layer of roving at an angle of −80° was wound over the top. The winding element located on the winding mandrel was then removed from the winding machine and cured at 190° C. in a hardening furnace. A heating up time of 4 hours and a dwell time of 2 hours was applied. After cooling of the cured structural part, the winding mandrel was withdrawn, i.e. removed and the structural part was pre-processed to a predetermined length. Then, it was carbonized in a non-oxidizing atmosphere over the course of a week, with a final temperature of 950° C. and a dwell time of 24 hours having been employed. The carbonized structural part was then impregnated once with pitch by the vacuum pressure process using an impregnation pressure of 6 bar, and then carbonized again as already described previously. The post-compacted and carbonized structural part was then graphitized at a temperature of 2,000° C. under non-oxidizing conditions. After cooling and dismantling of the graphitization furnace, the structural part was processed by milling and turning to form a cylindrical heating element with meandering indentations for a high temperature protective atmosphere furnace.

EXAMPLE 2

The structural part described below was provided for use as an insulation and protective cylinder in a high temperature protective atmosphere furnace.

A phenolic resin-containing fabric prepreg identical in texture (twill) and fiber foundation (graphite fiber) to that in Example 1 was used for the construction of this developable tubular structural part which was to have an internal diameter of 600 mm, a wall thickness of 40 mm and a length of 800 mm. However, in contrast thereto, in this example the fabric was formed of rovings made from 12,000 filaments and it had a thickness of just 0.5 mm and a weight per unit area of 440 g/m$^2$. The roving used for covering was formed of 12,000 high modulus graphite monofilaments which had a density of approximately 1.83 g/cm$^3$ (in accordance with DIN 65569) and, with regard to the monofilament, a tensile strength of approximately 3,000 MPa (using DIN ENV 1007-4). Layers of graphite foil and of graphite non-woven material were additionally wound in this case. The graphite foils had a thickness of 0.5 mm, an apparent density following DIN ISO 536 of 1.0 g/cm$^3$ and a weight per unit area of 1,000 g/m$^2$. In order to improve bonding of the foil layers to the prepreg layers following them, the contact side of the graphite foils was coated with an adhesive resin before winding of the following prepreg layers. The graphite non-woven material had been produced from a non-woven material being formed of cellulose fibers by carbonization and graphitization. It had a thickness of 10 mm and a weight per unit area in accordance with DIN 53854 of approximately 1,000 g/m$^2$. These fabric prepregs, rovings, graphite foils and graphite non-woven materials were wound on a winding machine on a mandrel with a 600 mm diameter, the surface of which had previously been coated with a separating agent, with the following sequence of layers and with the following thread tensions of the rovings:

| | |
|---|---|
| 1st sequence of layers: | four plies of prepreg, total ply thickness 2 mm. |
| 2nd layer: | a double ply of roving, 0.5 mm thick, thread tension 100 N, winding angle of first ply +80°, of second ply −80°. |
| 3rd layer: | a ply of graphite foil, ply thickness 0.5 mm. |
| 4th layer: | a ply of graphite non-woven material, ply thickness 10 mm. |

-continued

| | |
|---|---|
| 5th layer: | a ply of graphite foil, ply thickness 0.5 mm. |
| 6th layer: | a ply of prepreg, ply thickness 0.5 mm. |
| 7th layer: | a double ply of roving, 0.5 mm thick, thread tension 100 N, winding angle of first ply +80°, of second ply −80°. |
| 8th layer: | a ply of graphite foil, ply thickness 10 mm. |
| 9th layer: | a ply of graphite foil, ply thickness 0.5 mm. |
| 10th layer: | a ply of prepreg, ply thickness 0.5 mm. |
| 11th layer: | a double ply of roving, 0.5 mm thick, thread tension 120 N, winding angle of first ply +80°, of second ply −80°. |
| 12th layer: | a ply of graphite non-woven material, ply thickness 10 mm. |
| 13th layer: | a ply of graphite foil, ply thickness 0.5 mm. |
| 14th layer: | a ply of prepreg, ply thickness 0.5 mm. |
| 15th layer: | four double plies of roving, ply thickness 2.0 mm in total, thread tension 130 N, winding angle ±80°. |

The structural part being formed of the above-mentioned layers had a total thickness of 40 mm after winding. The wound element located on the winding mandrel was removed from the winding machine and, as described in Example 1, cured, carbonized and graphitized. However, in contrast to the procedure according to Example 1, the structural part was not post-compacted in the carbonized state. The graphitized structural part was then processed to the predetermined length and provided with holes for measuring and manipulation devices. The incorporated layers of non-woven material impart pronounced thermal insulation properties to the structural part. In a test run the temperature inside the cylinder was 1,600° C. and the temperature outside thereof was only 400° C. In addition, the cylinder acted as a vapor and gas barrier due to the incorporated layers of graphite foils.

EXAMPLE 3

A phenolic resin-containing fabric prepreg was used for the construction of the developable structural part. The fabric of the prepreg had been produced in twill weave from a graphite fiber roving which was formed of 6,000 monofilaments. The weight per unit area of the fabric was 420 g/m². The roving used was formed of 12,000 high modulus graphite monofilaments which had a density of approximately 1.83 g/cm³ (in accordance with DIN 65569) and, based on the monofilament, a tensile strength of approximately 3,000 MPa (following DIN ENV 1007-4). The elongation at break of these fibers is in a range of from 0.6 to 1.0% (measured by following DIN ENV 1007-4). These fabric prepregs and rovings were wound on a winding machine on a mandrel with a 1,145 mm diameter, the surface of which had been previously provided with a separating agent, with the following sequence of layers and with the following thread tensions of the roving:

| | |
|---|---|
| 1st layer: | three plies of fabric prepreg, total ply thickness of 1.5 mm. |
| 2nd layer: | a double ply of roving, winding angle of +80° and −80°, thread tension 90 N per roving, ply thickness of 1.3 mm. |
| 3rd layer: | three plies of fabric prepreg, total ply thickness 3.5 mm. |
| 4th layer: | a simple ply of roving, winding angle of +80°, thread tension 180 N, ply thickness 0.7 mm. |

The wound element located on the winding mandrel was removed from the winding machine and, as described in Example 1, cured, carbonized and graphitized. However, in contrast to the method of proceeding according to Example 1, the structural part was not post-compacted in the carbonized state. The developable structural part that was produced had an external diameter of 1,150 mm, an internal diameter of 1,140 mm and a length of 850 mm. It is constructed to be used as a heat shield in a furnace for producing semiconductors.

EXAMPLE 4

In this embodiment a blank for a developable structural part was produced on a conventional winding device which had a pin collar on both sides of the mandrel, in each case for retaining and positioning the roving which was to be wound. The blank contained, inter alia, roving layers at a winding angle of 20°. A prepreg produced from a fabric in twill weave 2/2 made from graphite fiber rovings (3,000 filaments per roving) with a weight per unit area of 225 g/m² which had been impregnated with a phenolic resin of the resol type (weight per unit area of the prepreg, 433 g/m²) with a layer thickness of 0.3 mm was applied as a first layer on a mandrel with a diameter of 210 mm. This first layer was then covered by a roving with a thread tension of 70 N by using winding angles of firstly +20°, and secondly of −20°. The thickness of this second winding layer which was formed of two layers of rovings, was 1.2 mm. The roving used was formed of 24,000 graphite filaments. The filaments of the rovings had a bulk density of 1.8 g/cm³ (in accordance with DIN 65569), a tensile strength (following DIN ENV 1007-4) of 2,400 MPa and an elongation at break (following DIN ENV 1007-4) from 0.6 to 1.0%. A third 0.3 mm thick layer of the same prepreg, as was used for the first winding layer, was wound over this second layer. A fourth 1.2 mm thick layer made from a roving as was used for the second layer, followed this third layer. This layer also was formed, like the second layer, of two layers of a roving which had been wound a first time at a winding angle of +20° and a second time at an angle of −20°. In contrast to the second layer, the thread tension during winding was 80 N in this case. A layer of prepreg with a thickness of 0.3 mm which corresponded in terms of material and construction to the prepreg layer of the first and third layers, followed as a fifth layer. An external edge formed a sixth layer made from a roving which was wound as a double layer at winding angles of plus and minus 80° at a thread tension of 90 N. The same roving was used for this purpose as had also been used for the previous second and fourth layers. After the winding process, the winding element was cured, then removed from the winding mandrel, then carbonized at 900° C. and subsequently graphitized at 2,000° C. The developable structural part produced in this way served as a highly rigid bearing roller in a high temperature protective atmosphere furnace.

DESCRIPTION OF THE PREFERRED EMBODIMENTS

Figure 1:
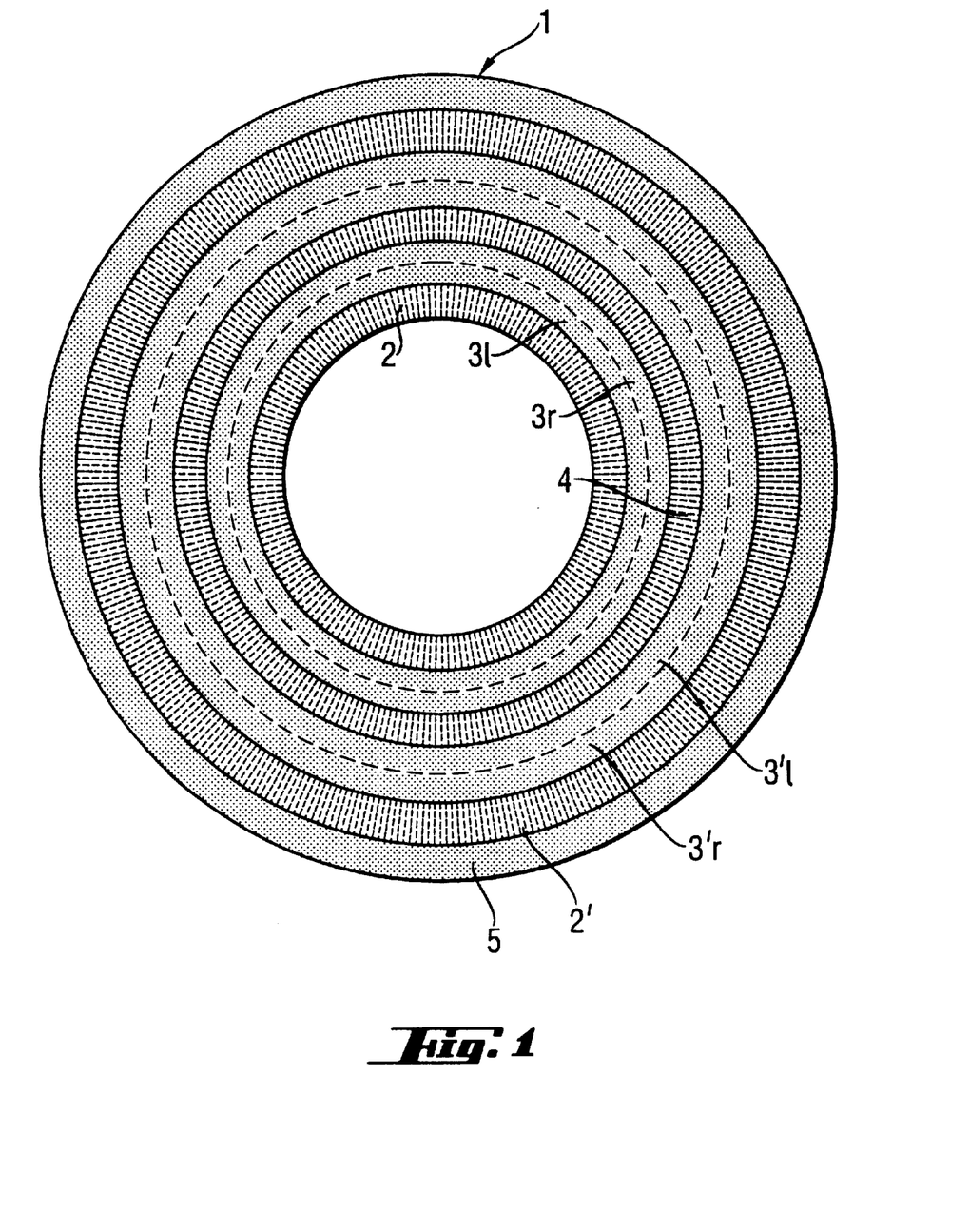
FIGS. 1, 2 and 3 are diagrammatic, cross-sectional views perpendicular to a longitudinal axis showing a construction of developable structural parts according to the invention, made from layers of wound materials.

Referring now to the figures of the drawings in detail and first, particularly, to FIG. 1 thereof, there is seen a structural part 1 made from carbon reinforced with graphite fibers. The structural part is constructed to be subjected to internal pressure. When producing the structural part 1 an innermost first ply 2 was wound from a phenolic resin-containing prepreg, the basic fabric of which had a twill weave and had been produced from rovings made from high modulus graphite filaments. In this case, winding was carried out in such a way that warp threads of the fabric were aligned perpendicularly to a longitudinal axis of the structural part. A second ply 3*l*, 3*r* is formed of two layers 3*l* and 3*r*. During winding it was formed of a phenolic resin-containing roving made from high modulus graphite filaments which had been wound once at an inclination of $-85°$ for the layer 3*l* and once at an inclination of $+85°$ for the layer 3*r* relative to the longitudinal axis of the structural part. A third ply 4 made from a prepreg impregnated with a phenolic resin then followed. A basic fabric of the prepreg had been produced from rovings made from high modulus graphite filaments and the basic fabric had been woven in linen weave. A double layer 3'*l*, 3'*r* which had been constructed like the second ply 3*l*, 3*r* but had been wound with a greater thread tension than the latter, then followed this layer 4 as a fourth ply. Following this fourth ply a layer made from a prepreg was wound as a fifth ply 2'. The prepreg corresponded to the prepreg 2 in the first ply in terms of construction and orientation. A phenolic resin-containing ribbon made from 5 rovings of high modulus graphite filaments had been wound as an outermost sixth ply 5 at a winding angle of $90°$ relative to the longitudinal axis of the structural part, with a thread tension which was greater than that with which the roving 3*l*, 3*r* of the fourth ply had been wound. The winding element was subjected to a curing treatment and was carbonized after the winding mandrel was pulled out.

Figure 2:
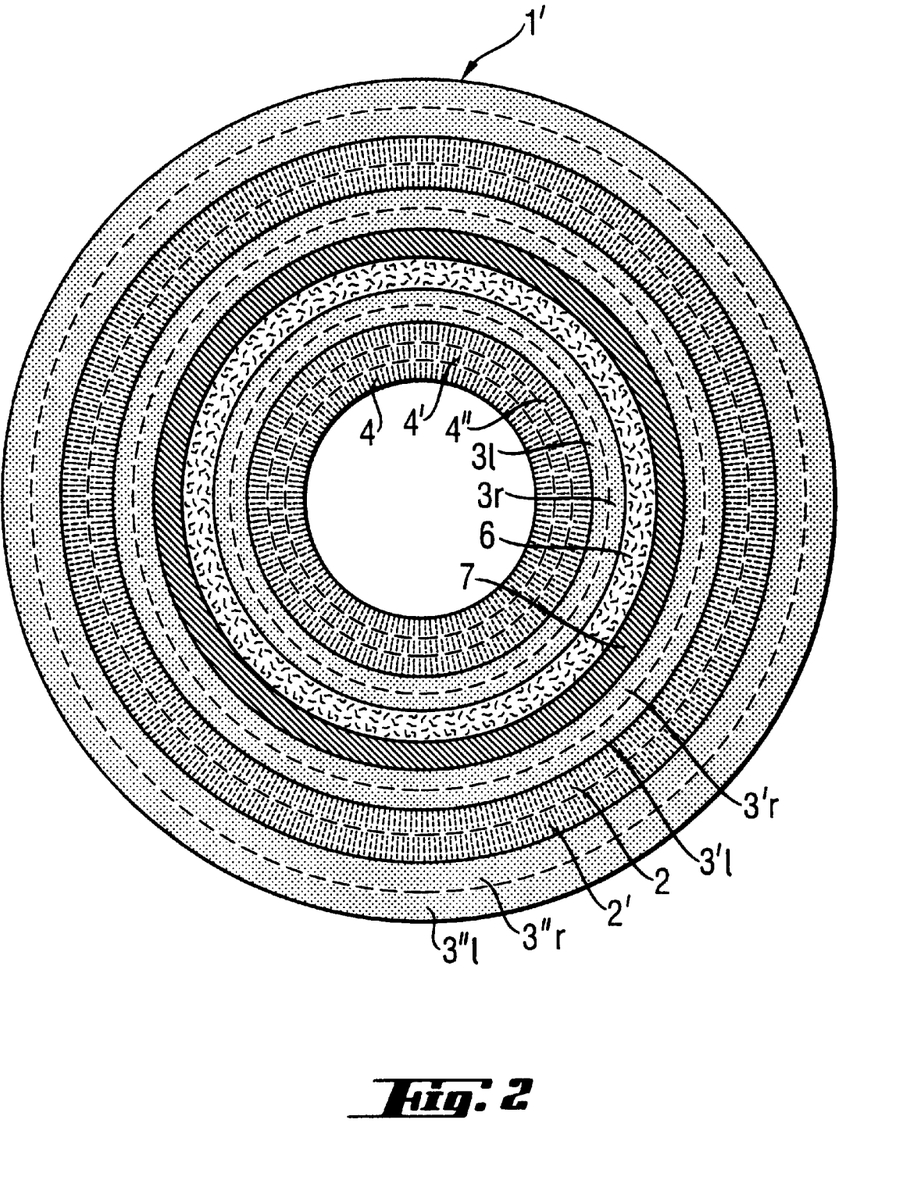

FIG. 2 illustrates a developable structural part 1' which is to be used as a thermal insulation cylinder with vapor or gas barriers in a high temperature protective atmosphere furnace. A description of what the individual layers had been constructed from and how, during production prior to curing of the resin structural parts, is given below. After curing, the structural part was then carbonized and graphitized. A first ply was formed of three layers 4, 4', 4'' of a plain fabric being formed of graphite fibers and impregnated with an epoxy resin. Two layers 3*l* and 3*r* of a graphitized yarn made from carbon staple fibers and containing an epoxy resin had been wound thereon as a second ply 3*l*, 3*r* with a thread tension of 40 N and at an angle of $-80°$ for the layer 3*l* and $+80°$ for the layer 3*r*. A third ply 6 was formed of a graphitized cellulose non-woven material with a thickness of 8 mm which had not been impregnated with resin. A fourth ply 7 of a 0.2 mm thick sheet of molybdenum having ends which slightly overlapped a position of impact of a sheet web, followed this third ply 6. A fifth ply 3'*r*, 3'*l* located thereabove was formed of two layers 3'*r* and 3'*l* of a phenolic resin-containing roving of graphite filaments which had been applied for a first time at a winding angle of $+80°$ for the layer 3'*r* and for a second time at a winding angle of $-80°$ for the layer 3'*l* relative to the longitudinal axis of the structural part, with a thread tension of 120 N. A double layer 2, 2' of a phenolic resin-containing prepreg, the textile basis of which was a fabric made from a graphite yarn in twill weave, followed as a sixth ply 2, 2'. An outer seventh ply 3"*r*, 3"*l* was formed of two layers which had been wound for a first time at an angle of $+80°$ for the layer 3"*r* and for a second time at an angle of $-80°$ for the layer 3"*l*, with a phenolic resin-impregnated roving made from graphite filaments, which had been wound with a thread tension of 150 N.

Figure 3:
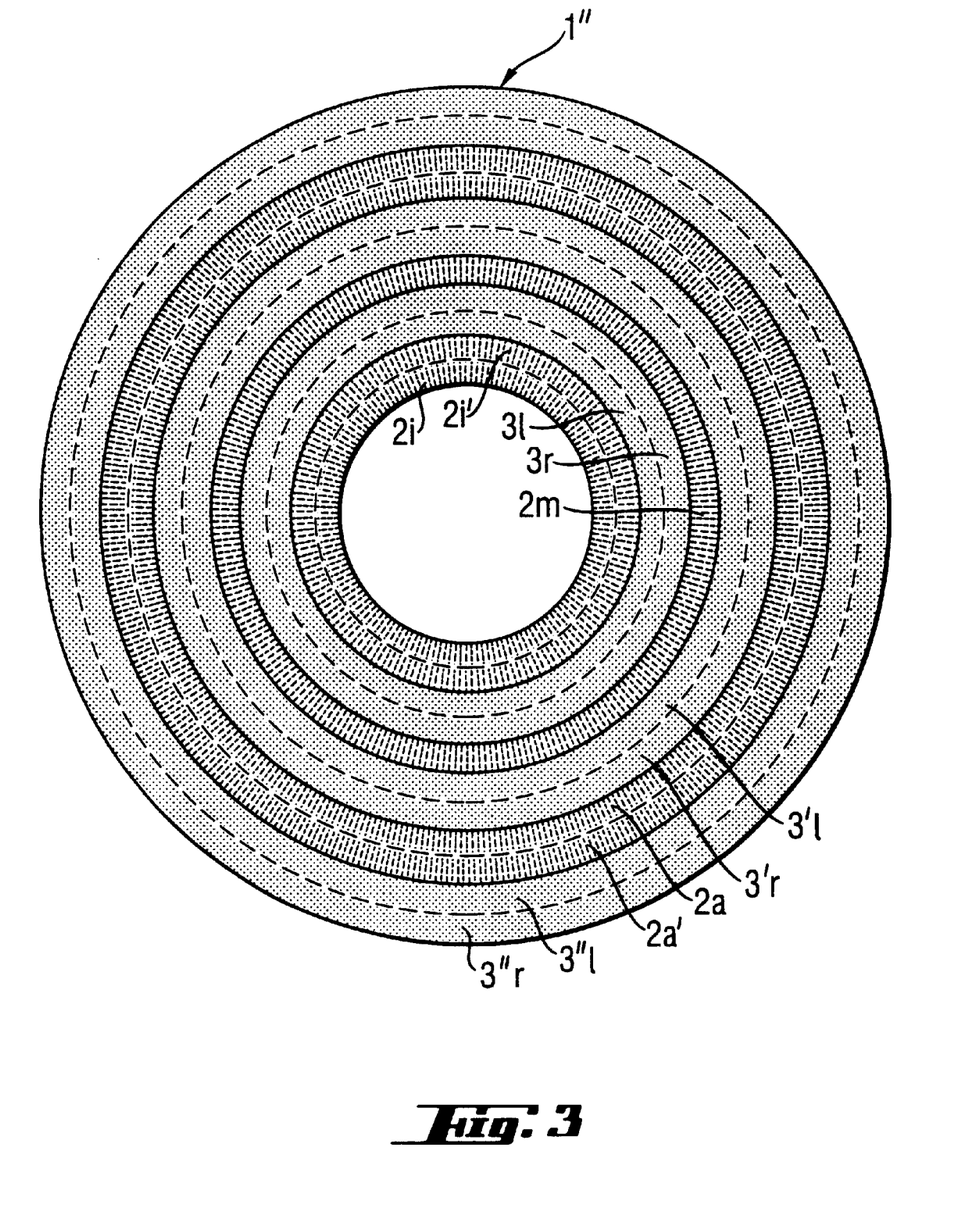

FIG. 3 shows a developable structural part 1", which has been constructed to be subjected to bending, after winding in a non-cured state. Such a structural part could be used after curing and final processing in the form of a roll or roller made from plastics material reinforced with carbon fibers for transporting or further processing continuous webs such as films, paper or textiles at normal room temperatures. According to another variation of use, the structural parts could still have been carbonized and graphitized after curing of a resin contained in the basic element. An inner first ply 2*i*, 2*i*' is formed of two layers 2*i* and 2*i*' made from a phenolic resin-containing fabric prepreg based on a twill made from rovings of high modulus graphite filaments. Winding was carried out in such a way that weft threads of the fabric were aligned parallel to the longitudinal axis of the winding element. A second ply 3*l*, 3*r* was formed of two layers of rovings 3*l* and 3*r* made from high modulus graphite filaments impregnated with phenolic resin. The layers had been wound by using two pin collars with a thread tension of 30 N for a first tome at an angle of $-20°$ for the layer 3*l* and for a second time at an angle of $+20°$ for the layer 3*r* relative to the longitudinal axis of the structural part. A following third ply 2*m* was formed of a layer made from a prepreg containing phenolic resin. The prepreg corresponded in construction and orientation to the prepreg which had been used for the first layer 2*i*, 2*i*'. A fourth ply 3'*l*, 3'*r* was is formed of two layers 3'*l* and 3'*r* made from a roving which corresponded in construction and pre-treatment to the roving used for the second ply 3*l*, 3*r*. However, in contrast thereto, the roving in this case was wound at a winding angle of $-75°$ for the layer 3'*l* and $+75°$ for the layer 3'*r* at a thread tension of 140 N. A fifth ply 2*a*, 2*a*' following thereon was formed of two layers 2*a* and 2*a*' made from fabric prepreg which corresponded in construction and orientation to the fabric prepreg which had been used in the first layer 2*i*, 2*i*' and in the third layer 2*m*. An external sixth ply 3"*l*, 3"*r* which also is formed of two layers 3"*l* and 3'*r* was again formed from a roving containing phenolic resin made from high modulus graphite filaments, but which had been wound for a first time at an angle of $-85°$ for the layer 3"*l* and for a second time at an angle of $+85°$ for the layer 3"*r* relative to the longitudinal axis of the structural part.

Figure 4:
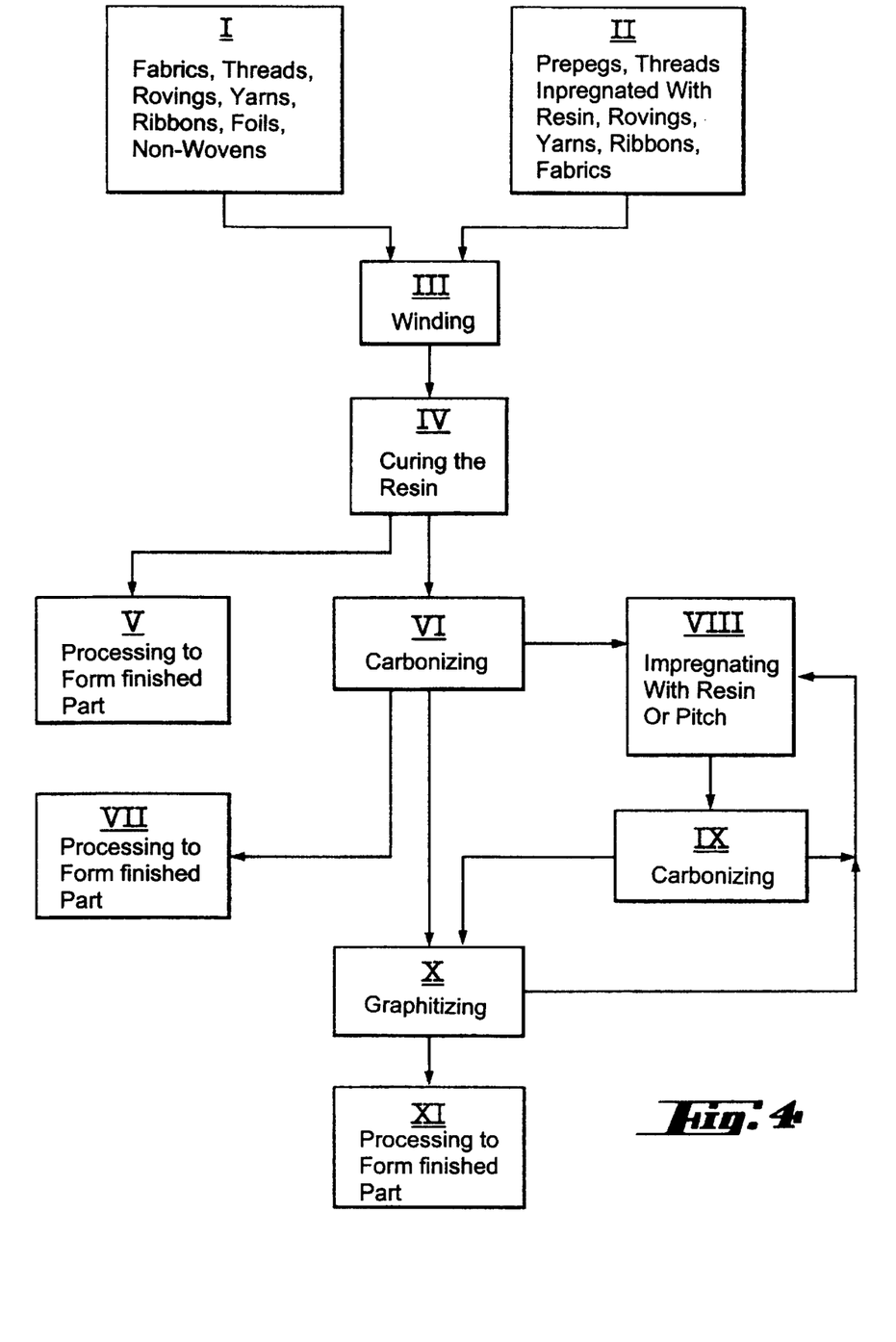
FIG. 4 is a flow diagram illustrating possibilities of process sequences, according to which developable structural parts according to the invention can be produced.

Process steps which can be seen in FIG. 4 can be carried out on devices known from the state of the art. A more precise description thereof is therefore superfluous at this point. The block diagram shows two supply or storage containers I and II. The container I contains resin-free starting materials such as fabrics, threads, yarns, rovings, ribbons and non-woven materials or foils. The container II contains resinous starting materials such as fabrics, threads, yarns, rovings, ribbons and non-woven materials or foils. In order to produce developable structural parts, resin-free fabrics from the supply container I may be wound at a winding unit III on a temporary mandrel and then covered by resin-impregnated threads, yarns, rovings or ribbons from the supply container II. Prepregs from the supply container II can also be wound on the mandrel and then covered with resin-free threads, yarns, rovings or ribbons from the supply container I. Such winding elements are sometimes impregnated with a resin after winding, which is not shown. Preferably, however, prepregs and threads, yarns, rovings or ribbons impregnated with resin from the supply container II are processed on the winding device III to form a preliminary product element. If additional foils or non-woven materials are to be integrated into the winding element these are generally, but not exclusively, resin-free and originate from the supply container I. In some applications the foils are provided with an adhesive layer of resin on at least one of flat surface during winding with the winding unit III. The various possibilities according to which the various raw materials from the supply containers I and II can be combined and disposed during winding are illustrated in the description of the invention which is referred to herein. The winding elements obtained after the winding process with the winding unit III are then placed in a device IV in which the resin fraction contained therein is cured.

According to a variant, plastics material elements reinforced with fiber materials which are obtained in this way can be processed further in units V for mechanically processing and finishing to form finished parts. According to another variant, the developable structural parts which have been removed from the winding core and contain cured resin, are supplied to a unit VI in which all of their structural parts which can be carbonized are converted into carbon. According to one possibility, the carbon elements obtained in this way are further processed in units VII for mechanical processing and finishing to form finished parts. According to another possibility, a twill, which has pores accessible to fluid after the pyrolysis process of carbonization, is impregnated with a suitable fluid agent containing carbon in an impregnating unit VIII and the impregnated element is carbonized again in a carbonization unit in order to carbonize an infiltrated carbon substrate. This process, which is called post-compacting and which brings about an improvement in the feature profile of the structural part, can also be carried out more than once. Such post-compacted, merely carbonized structural parts provided by units VIII+IX, can also be processed further in units VII to form finished parts, in a non-illustrated manner. They are, however, preferably subjected to a graphitization treatment in a unit X. The carbonized structural parts from the unit VI which are not to be directly processed or post-compacted at the units VIII+IX to form finished parts in the unit VII, also end up in this unit X. Graphitized structural parts obtained in this way can be post-compacted in the units VIII+IX again and then supplied to one of the possible further processing stages (VII, in a non-illustrated manner or X), which only occurs if the structural part appears to justify the demands and the expense. However, the structural parts are preferably processed further to form finished parts after graphitizing in units XI.

We claim:

1. A process for producing developable structural parts made from fibrous composites, which comprises:
   applying at least two layers of a resin-impregnated fabric and at least two layers made from resin-saturated or resin-free wound threads, yarns, ravings or ribbons onto a shaping temporary mandrel winding each layer of thread, yarns, ravings, or ribbons with a greater thread tension than a previously wound layer of threads, yarns, ravings or ribbons, to form a structural part having an outer ply formed of the wound threads, yarns, ravings or ribbons; and
   treating the structural part by a step selected from the group consisting of curing; curing and carbonizing; and curing, carbonizing and graphitizing, after the winding step.

2. The process according to claim 1, which further comprises keeping the structural part in a winding machine for intermediate treatments during the winding step.

3. The process according to claim 1, which further comprises not intermediately hardening the structural part between applications of the layers.

4. The process according to claim 1, which further comprises applying at least one layer of non-woven material during the winding step.

5. The process according to claim 4, which further comprises applying the at least one layer of non-woven material from the group consisting of non-woven materials made from carbon fibers, graphite fibers, cellulose fibers, polyacrylonitrile fibers and ceramic fibers.

6. The process according to claim 1, which further comprises additionally applying at least one foil layer during the winding step.

7. The process according to claim 6, which further comprises applying the at least one foil from the group consisting of graphite foils and metal foils.

8. The process according to claim 7, which further comprises applying at least one foil containing molybdenum as the at least one foil.

9. The process according to claim 1, which further comprises providing the prepregs used for winding with a basic fabric formed of fibers made from carbon, graphite or molybdenum; and providing the threads, yarns, rovings or ribbons used for winding with monofilaments or fibers made from carbon, graphite or molybdenum.

10. The process according to claim 1, which further comprises providing a fabric for winding being impregnated with phenolic resin, epoxy resin, pitch or mixtures thereof to obtain a fabric prepreg.

11. The process according to claim 1, which further comprises providing each of the prepreg layers for winding with a thickness in a range from 0.20 to 2.00 mm in an initial state.

12. The process according to claim 1, which further comprises providing each of the prepreg layers for winding with a thickness in a range from 0.50 to 1.00 mm in an initial state.

13. The process according to claim 1, which further comprises providing the rovings for winding with 10,000 to 60,000 monofilaments.

14. The process according to claim 13, which further comprises forming the roving of carbon or graphite monofilaments having a density from 1.75 to 1.90 g/cm$^3$.

15. The process according to claim 14, which further comprises providing the roving with a tensile strength in a range from 2,200 to 5,000 MPa.

16. The process according to claim 1, which further comprises carrying out the winding step with a ratio of the layers of fabric prepreg to the layers of thread, yarn, roving or ribbon windings between 1:1 and 4:1.

17. The process according to claim 1, which further comprises winding the threads, yarns, rovings or ribbons at an angle in a range from ±20 to ±90°.

18. The process according to claim 1, which further comprises carrying out the step of winding the threads, yarns, rovings or ribbons at a speed in a range from 20 to 200 m/min and with a thread tension in a range of 10 to 250 N per thread, yarn, roving or ribbon.

19. A process for producing developable structural parts made from fibrous composites, which comprises:
   applying at least two layers of a resin-impregnated fabric or prepreg selected from the group consisting of plain, twill, and satin, and at least two layers made from resin-saturated or resin-free wound threads, yarns, rovings or ribbons onto a shaping temporary mandrel using an at least constant thread tension during winding of each layer made from threads, yarns, rovings or ribbons, and winding each layer of threads, yarns, rovings or ribbons with a greater thread tension than a previously wound layer of threads, yarns, rovings or ribbons, to form a structural part having an outer ply formed of the wound threads, yarns, ravings or ribbons; and
   treating the structural part by a step selected from the group consisting of curing; curing and carbonizing; and curing, carbonizing and graphitizing, after the winding step.

* * * * *